United States Patent [19]
Pacht

[11] Patent Number: 5,253,808
[45] Date of Patent: Oct. 19, 1993

[54] POWER ASSISTED DUMP VALVE

[75] Inventor: Amos Pacht, Houston, Tex.

[73] Assignee: Butterworth Jetting Systems, Inc., Houston, Tex.

[21] Appl. No.: 899,357

[22] Filed: Jun. 16, 1992

[51] Int. Cl.$^5$ .......................... B05B 1/14; B05B 9/01
[52] U.S. Cl. ................................. 239/124; 239/443; 137/882; 137/883; 137/625.6
[58] Field of Search ............... 239/124, 443, 447, 445; 137/861, 862, 871, 882, 883, 625.6; 251/322, 323, 324, 325, 28, 30.01, 41.45

[56] References Cited

U.S. PATENT DOCUMENTS

| | | | |
|---|---|---|---|
| 3,536,294 | 10/1970 | Rodriguez | 251/45 X |
| 3,672,575 | 6/1972 | Hinrichs | 239/445 |
| 3,690,565 | 9/1972 | Abos | 239/447 |
| 3,765,607 | 10/1973 | Pacht | 239/124 |
| 3,802,628 | 4/1974 | Goss et al. | 239/445 X |
| 3,885,739 | 5/1975 | Tuttle | 239/124 |
| 3,986,523 | 10/1976 | Pacht | 239/443 X |
| 3,987,963 | 10/1976 | Pacht | 239/124 |
| 4,349,154 | 9/1982 | Pacht | 239/124 |
| 4,413,785 | 11/1983 | Engelbert et al. | 239/443 |
| 4,462,428 | 7/1984 | Guenther et al. | 239/124 X |
| 4,602,740 | 7/1986 | Stachowiak | 139/124 |
| 5,117,872 | 6/1992 | Yie | 137/882 |
| 5,165,451 | 11/1992 | Goldsmith | 239/124 X |

Primary Examiner—Andres Kashnikow
Assistant Examiner—Lesley D. Morris
Attorney, Agent, or Firm—Jones, Day, Reavis & Pogue

[57] ABSTRACT

A power assisted dump valve for a high pressure nozzle system. The dump valve is formed from a unitary housing or valve body. A valve chamber in the valve body includes a slidable piston which, in a first position, closes an atmospheric channel and allows high fluid pressure to be present at the nozzle and, in a second position, opens the atmospheric channel and allows the input fluid to dump to atmosphere to remove the high fluid pressure at the nozzle. A resilient spring, in conjunction with the piston, causes a snap action when the piston closes the atmospheric channel thereby forming a good seal.

12 Claims, 3 Drawing Sheets

POWER ASSISTED DUMP VALVE

FIELD OF THE INVENTION

The present invention relates in general to high pressure fluid delivery systems and in particular to an improved power assisted dump valve for use in controlling the flow of fluid through a high pressure nozzle.

BACKGROUND OF THE INVENTION

High pressure fluid delivery systems have been used for many applications. Details of such systems are illustrated in U.S. Pat. Nos. 3,765,607 and 4,349,154, both assigned to the assignee of the present invention. Such systems typically use water for cleaning fluid and include a high pressure pump and a hand-held nozzle for directing a stream of fluid at an object to be cleaned. Most such systems also include a valve arrangement, usually in the hand-held nozzle assembly, by which the operator can stop and start the flow of high pressure fluid through the nozzle. Due to the fact that the pressures used in such systems often exceed 10,000 psi, the construction of valves that will operate safely is much more difficult than it would at first seem. The valves often require considerable force to operate and result in operator fatigue. The high pressure flow from the nozzle assembly is usually stopped by simply switching the flow to a large opening coupled to ambient pressure. It is sometimes desirable for the dump outlet to be located remotely from the nozzle while the valve is controlled from the nozzle location.

Further, because of the high pressures used in these valves, the parts erode very quickly. In addition, there is a limit to the pressure or flow that can be handled by a hand-controlled valve simply because of the forces involved. Also, in the prior art devices, a shut-off pin and its seal have to be made very large and rugged because of erosion and thus are expensive to manufacture and maintain. Further, in the prior art, the only way to operate the high pressure valve at a remote distance is with a solenoid. It would be desirable to be able to provide a remote controlled valve coupled through a small hose to a trigger housing.

The present invention overcomes the disadvantages of the prior art by providing an improved power assisted dump valve which has a unitary housing or valve body with a fluid passageway extending through the valve body and having a low pressure fluid source coupled to one end as the input and a high pressure fluid nozzle assembly coupled to the other end as the output. A valve chamber extends into the unitary valve body and is sealably closed at one end with a fluid pressure dump assembly. The assembly has a channel therein for dumping fluid in the valve chamber to the atmosphere. A piston is slidably carried in the valve chamber. The piston has a first portion with a first diameter for sealably separating the chamber into first and second sections and a second portion with a second smaller diameter extending into the second chamber section for sealably mating with the channel in the dump assembly to prevent fluid flow to the atmosphere. A resilient spring member is interposed between the piston and the first chamber section to urge the piston into sealing relationship with the channel in the dump assembly. The combined relationship of the spring and the fluid pressure on the piston causes a snap action when the piston closes the dump channel. Because of this snap action and the high sealing force, even if there are slight imperfections in the channel in the dump assembly, the pressure will deform the slight imperfections and make a good seal. A control valve is coupled to the first chamber section for selectively closing and venting the first chamber section such that when the control valve is in the closed position, the dump assembly channel is sealed with the snapping action of the piston and fluid is forced at a high pressure out the high pressure nozzle and, when the control valve is in the vent position, the dump assembly channel is open and the fluid is dumped to ambient pressure so as to remove the high pressure at the output of the high pressure nozzle.

The control valve is associated with a plate rigidly connected to the unitary valve body. A second fluid passageway is formed in the unitary valve body coupling the first chamber section to the outside of the unitary valve body. A control orifice in the plate is in sealed fluid flow alignment with the second fluid passageway in the unitary valve body. A shut-off pin is sealably and slidably mounted in the plate for movement between first and second positions to selectively open and close the control orifice thereby venting and closing the first chamber section. A third passageway in the plate assembly couples the control orifice to the atmosphere such that when the shut-off pin opens the control orifice, the first chamber portion in the unitary valve is vented to atmosphere so as to enable the fluid pressure to move the piston to open the channel in the fluid pressure dump assembly and remove the high pressure from the high pressure nozzle assembly. When the shut-off pin closes the control orifice, the first chamber portion in the unitary valve is pressurized through a second orifice in the piston to cause the piston to close the dump assembly in conjunction with the spring with a snapping action.

Because the shut-off pin is formed in a separate plate that is attached to the unitary valve body, the components in the plate including the shut-off pin and associated components can be made smaller and less expensive even if they are quickly eroded because they can be easily and economically replaced.

As an additional safety feature, an additional control valve is placed in parallel with the first control valve such that when the additional control valve is open or vented, the high pressure cannot be created by operating the first control valve.

Thus, it is an object of the present invention to provide an improved power assisted dump valve with no limit to the pressure or flow that can be handled by the improved hand-controlled dump valve.

It is also an object of the present invention to provide a control valve with a spring urging a piston to seal the dump valve channel such that an incoming pressure offsets the spring pressure and balances the piston in the valve body to keep the dump valve channel open. When a valve controller is actuated so as to cause the full pressure to assist the spring, the valve closes the dump channel with a snapping action thus providing a high sealing force so that even if there are slight imperfections in the dump channel sealing area the pressure will deform the imperfections and make a good seal.

It is still another object of the present invention to provide a remote-controlled device with the improved dump valve so that it can be operated from a distance.

It is yet another object of the present invention to provide an additional control valve in parallel with the first control valve such that when the additional control valve is in the open or vent position, the high pressure that cannot be created by operating the first control valve thus providing a safety feature.

SUMMARY OF THE INVENTION

Thus, the present invention relates to a valve for receiving a flow of fluid from a low pressure fluid source and selectively causing a high pressure output at the output of a nozzle assembly. The valve comprises a unitary valve body with a fluid passageway extending through the valve body and having the low pressure fluid source coupled to one end as the input and the high pressure fluid nozzle assembly coupled to the other end as the output. A valve chamber extends into the unitary valve body. A fluid pressure dump assembly sealably closes one end of the valve chamber with the assembly having a channel for dumping fluid in the valve chamber to the atmosphere. A piston is slidably carried in the valve chamber. The piston has a first portion with a first diameter for sealably separating the chamber into first and second sections and a second portion with a second smaller diameter extending into the second chamber section for sealably mating with the channel in the dump assembly to prevent fluid flow to the atmosphere. A resilient spring member is interposed between the piston and the first chamber section to urge the piston in sealing relationship with the channel in the dump assembly. A first orifice in the piston has a diameter sufficient to receive the resilient spring member and a second orifice in the piston enables fluid communication between the first and second chamber sections. A fluid conduit couples the fluid passageway to the second chamber section such that fluid introduced at the low pressure inlet may be selectively used to either force the piston against and compress the resilient spring member in the first chamber section to open the channel in the dump assembly and dump the fluid in the second chamber section to atmosphere or to assist the spring member in snapping the piston against and sealing the dump assembly channel to create the high pressure output. A control valve has a control orifice and is coupled to the first chamber section for selectively closing and venting the first chamber section such that when the valve is in the closed position, the dump assembly channel is sealed with a snapping action of the piston and fluid is forced at high pressure out the high pressure nozzle. When the valve is in the vent position, the dump assembly channel is opened and the fluid is dumped to ambient pressure so as to remove the high pressure at the output of the high pressure nozzle.

The invention further comprises a manual controlled device to selectively open and close a second control orifice in parallel with the control orifice in the control valve so as to provide a safety device when the second control orifice is in the open position and prevents the discharge of high pressure fluid with the use of the pivotal grip until the manual control device moves a second shut-off pin to close the second control orifice.

BRIEF DESCRIPTION OF THE DRAWINGS

These and other objects of the present invention will be more fully understood in conjunction with the accompanying drawings in which like numbers indicate like components and in which.

DETAILED DESCRIPTION OF THE DRAWINGS

Figure 1:
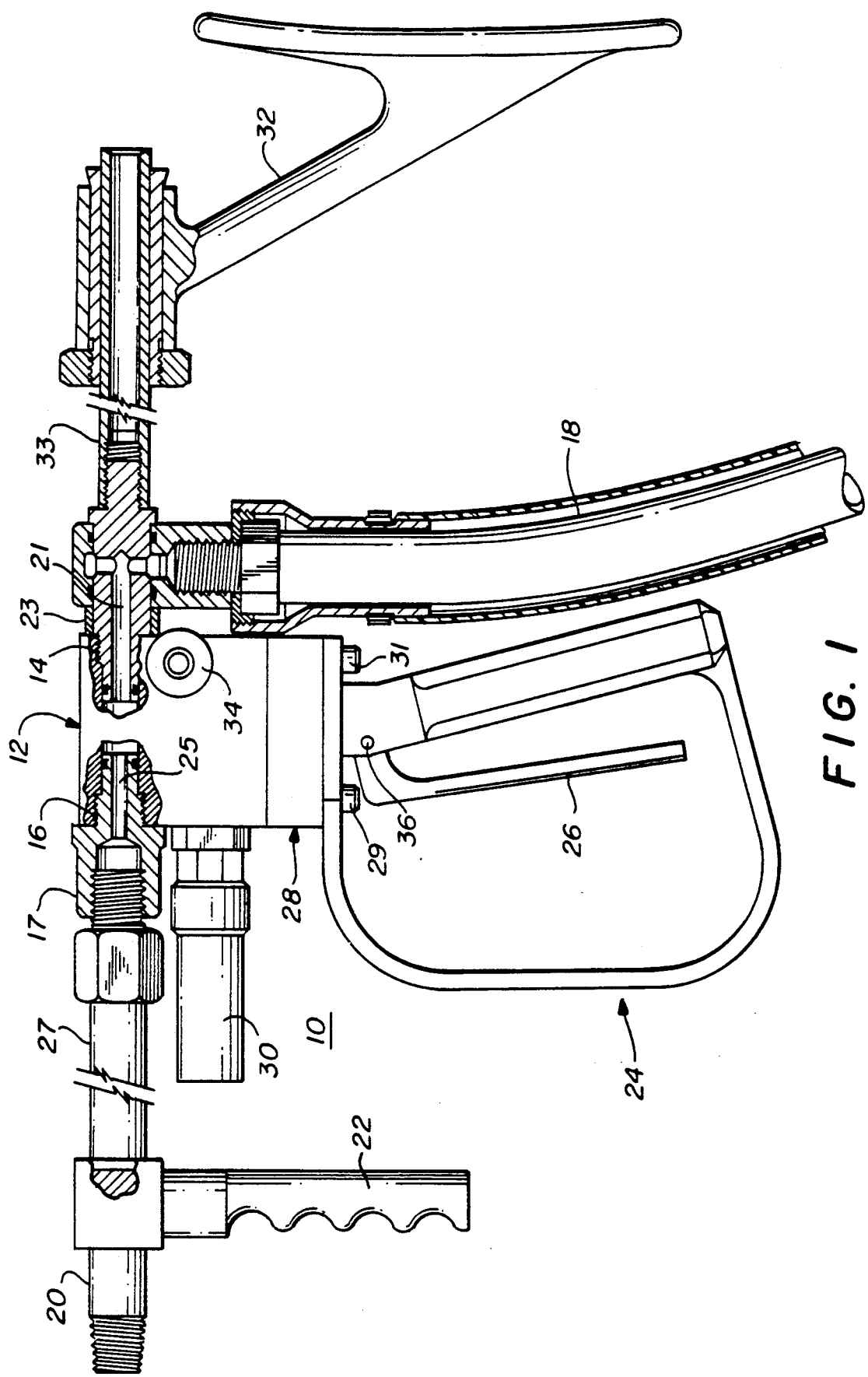
FIG. 1 is a side view of the novel high pressure fluid gun.

The novel high pressure fluid gun 10 is illustrated in FIG. 1. It comprises unitary valve body 12 having a low pressure input 14 and a high pressure output 16. A low pressure fluid source (not shown) is coupled through hose 18 and passageway 21 in a swivel input 23 to the input 14 of valve body 12. Orifice 16 and adapter 17 couples the output to high pressure nozzle 20 through conduit 27. A handle 22 is attached to the conduit 27 to provide a grip for holding the gun 10 during operation. A second handle 24 comprises a pivotable grip 26 pivoted at 36 to the handle 24. The handle 24 is coupled to a control valve 28 and the handle 24, control valve 28 and unitary valve body 12 are connected together by means of bolts 29 and 31. A stock 32 is attached to an extension 33 on the rear thereof such that the gun 10 can be held between the shoulder and the forward handgrip 22. A manual control device or valve 34 is operatively associated with the unitary valve body 12 to provide a safety device such that when the manual valve 34 is open, closing of the pivotable handle 26 will not cause a high pressure discharge at the high pressure nozzle assembly 20.

When the gun 10 is in the normal operating mode with grip 26 in its open position, the fluid coming through hose 18 simply passes through valve assembly 12 to the discharge or dump assembly spout or orifice 30 that is coupled to ambient pressure. When the grip 26 is compressed or moved to its second position, the valve assembly 12 closes off the discharge orifice 30 causing the fluid to flow through conduit 25, which has a smaller diameter than conduit 21, thereby resulting in a high pressure fluid exiting from the high pressure nozzle 20.

Figures 2, 3:
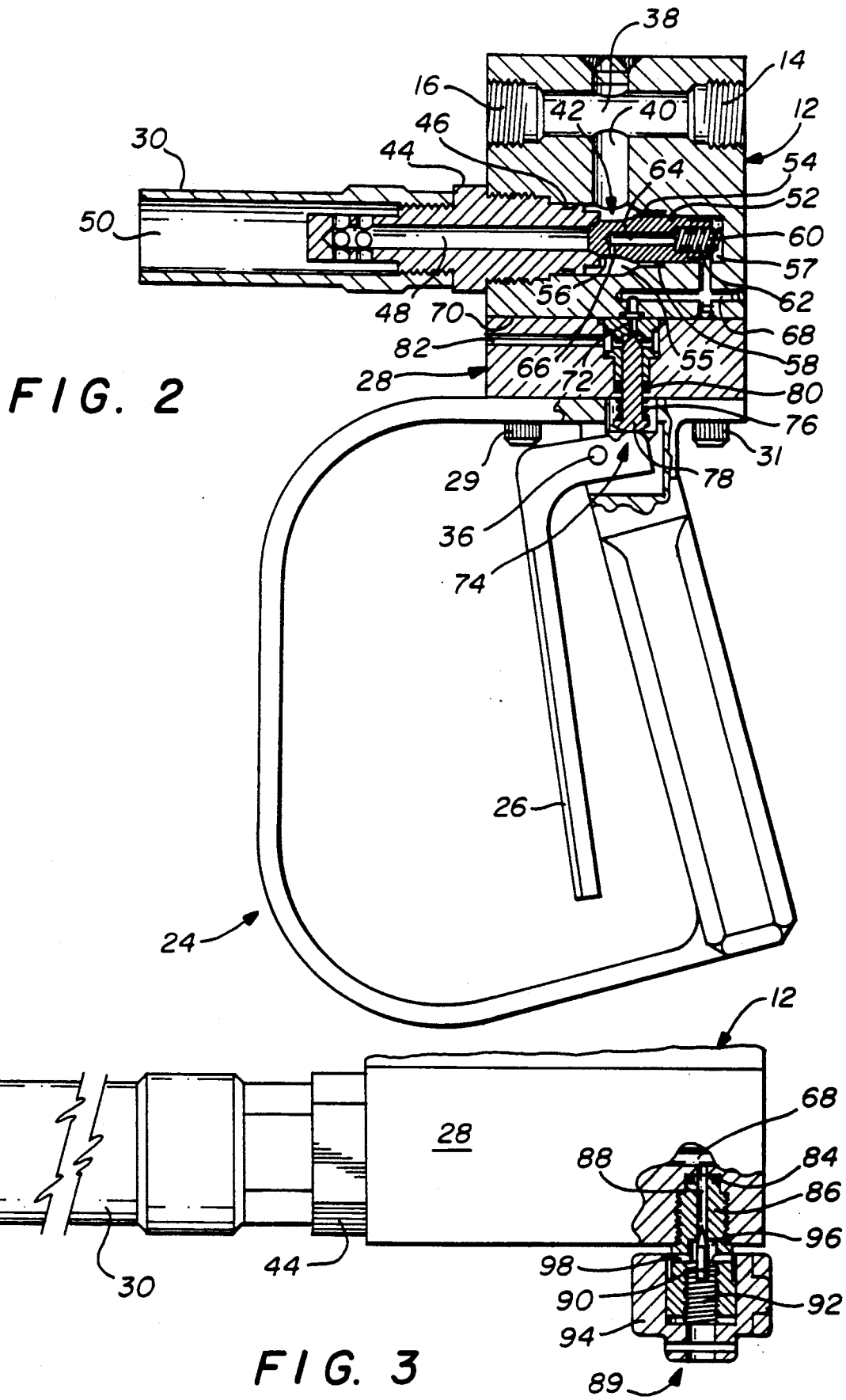
FIG. 2 is a detailed cross-sectional view of the control valve in the high pressure fluid gun of FIG. 1.
FIG. 3 is a partial cross-sectional top view of the control valve illustrating the manually controlled device for providing a safety feature to prevent accidental operation of the high pressure fluid gun.

The details of the novel dump valve are illustrated in FIG. 2. The unitary valve body 12 has an input 14 coupled to an output 16 by a fluid passageway 38. The input 14 has the low pressure fluid source connected to it and the output 16 has the high pressure fluid nozzle assembly connected to it as illustrated in FIG. A fluid conduit 40 couples the passageway 38 to a valve chamber 42 that extends into the unitary valve body 12. A fluid pressure dump assembly 44 sealably closes one end of the valve chamber 42. The assembly 44 has a channel 48 therein that is coupled to the atmosphere, ambient pressure, and is sealably inserted only partially into the unitary valve body 12 by means of O-ring 46 to sealably close one end of the valve chamber 42. The output of the fluid pressure dump assembly 44 at 50 is to the atmosphere. A piston 52 is slidably carried in the valve chamber 42. It has a first portion 54 with a first diameter for sealably separating the chamber 42 into first and second sections 57 and 55. It also has a second portion 56 with a second smaller diameter extending into the second chamber section 55 for sealably mating with and closing the channel 48 in the dump assembly 44 to prevent fluid flow to the atmosphere 50. A resilient spring 60 is interposed between the piston 52 and the first chamber section 57 to urge the piston 52 in sealing relationship with the channel 48 in the dump assembly 44. A first orifice 62 in the piston 52 has a diameter sufficient to receive the resilient spring member 60 and a second orifice 66 in the piston 52 enables fluid communication between the first and second chamber sections 55 and 57.

The fluid conduit 40 that couples the fluid passageway 38 to the second chamber section 55 allows the fluid introduced at the low pressure inlet 14 to be selectively used to either force the piston 52 against and compress the resilient spring member 60 in the first chamber section 57 to open the channel 48 in the dump assembly 44 and dump the fluid in the second chamber section 55 to atmosphere or to assist the spring member 60 in snapping the piston 52 against and sealing the dump assembly channel 48 to create the high pressure output. The control valve 28 may be in the form of a plate rigidly connected to the unitary valve body 12. A second fluid passageway 68 in the unitary valve body 12 couples the first chamber section 57 to the outside 70 of the unitary valve body 12. A first control orifice 72 in the control valve 28 is in sealed fluid flow alignment with the second fluid passageway 68 in the unitary valve body. A shut-off pin or needle valve 78 is sealably and slidably mounted in the control valve 28 for movement between first and second positions to selectively open and close the control orifice 72 thereby venting and closing the first chamber section 57. A third passageway 82 in the control valve 28 couples the control orifice 72 to the atmosphere such that when the shut-off pin 78 opens the control orifice 72, the first chamber section 57 in the unitary valve 12 is vented to atmosphere so as to enable the piston 52 to open the channel 48 in the fluid dump assembly 44 and remove the high pressure from the high pressure nozzle assembly 20 and when the shut-off pin 78 closes the control orifice 72, the first chamber section 57 in the unitary valve is pressurized through the piston's second orifice 56 to cause the piston 52 to close the dump assembly channel 48 with a snapping action.

A handle 24 is attached to the control valve 28 by means of bolts 29 and 31.

As stated previously, the purpose of the control valve 28 disclosed in FIG. 2 is to selectively close and vent the first chamber section 57 in the control valve 22 such that when the control valve is in the closed position, the dump assembly channel 48 is sealed with a snapping action of the piston 52 and the fluid is forced at high pressure out the high pressure nozzle 20. When the valve is in the vent position, as shown in FIG. 2 with the handle 26 in its normally open position, fluid is dumped to ambient pressure because fluid passes through piston orifice 66, orifice 64 of first chamber section 57, passageway 68, needle valve 78 and dump orifice 82. Resilient spring 60 fits within an orifice 62 and is thus interposed between the piston 52 and the first chamber section 57. It urges the piston 52 in sealing relationship with the channel 48 in the dump assembly 44. The first orifice 62 in the piston 52 has a diameter sufficient to receive the resilient spring member 60 and a second orifice 66 in the piston 52 enables fluid communication between the first chamber section 57 and the second chamber section 55. When low pressure fluid in passageway 38 is coupled through conduit 40 to second chamber section 55, the pressure may be selectively used to either force the piston 52 in the first chamber section against and compress the resilient spring member 60 in the first chamber section 57 to open the channel 48 in the dump assembly 44 and dump the fluid in the second chamber section 55 to atmosphere or to assist the spring member 60 in snapping the piston 52 against and sealing the dump assembly channel 48 to create the high pressure output.

The control valve elements generally designated by the numeral 74 are fluidly coupled to the first chamber section 57 for selectively closing and venting the first chamber section 57 such that when the control valve 28 is in the vent position, the dump assembly orifice 30 is open and the fluid is dumped to ambient pressure 50 so as to remove the high pressure at the output of the pressure nozzle 20. The control valve 28 further includes a second fluid passageway 68 in the unitary valve body 12 coupling the first chamber section 57 to the outside 70 of the unitary valve body 12. The control valve 28 is in the form of a housing rigidly connected to the unitary valve body 12. A first control orifice 72 in the control valve 28 is in sealed fluid flow alignment with the second fluid passageway 68 in the unitary valve body 12. A shut-off pin 78 is slidably and sealably mounted in the control valve 28 for movement between first and second positions to selectively open and close the control orifice 72 thereby venting and closing the first chamber section 57. A third passageway 82 is formed in the control valve 28 that couples the control orifice 72 to atmosphere such that when the shut-off pin 78 opens the control orifice 72, the first chamber section 57 in the unitary valve body 12 is vented to atmosphere so as to enable the piston 52 to open the channel 48 in the fluid pressure dump assembly 44 and remove the high pressure from the high pressure nozzle assembly 20 and when the shut-off pin 78 closes the control orifice 72, the first chamber portion 57 in the unitary valve body 12 is pressurized through the piston's second orifice 66 to cause the piston 52 to close the dump assembly channel 48 with a snapping action. Orifice 66 in piston 52 is always smaller than control orifice 72 in the control valve 28. By maintaining this difference, the static pressure behind the piston will always be released when control orifice 72 is opened.

The handle 24 is attached to the control valve 28 by means of bolts 29 and 31. A grip 26 is pivotally attached to the handle 24 at pivot point 36 and is in contact with the shut-off pin 78 for movement between first and second positions such that when the grip 26 is in the first position, the shut-off pin 78 opens the control orifice 72 to dump the high pressure and when the grip 36 is in the second position, the shut-off pin 78 closes the control orifice to create the high pressure at the high pressure outlet 20. A resilient spring 76 is in contact with the shut-off pin 78 to urge the pin 78 into its first position to open the control orifice 72, vent the first chamber section 57, open the channel 48 in the fluid dump assembly 44 and remove the high pressure from the high pressure nozzle assembly 20. O-ring 80 sealably encloses the shut-off pin 78 in the control valve 28.

A novel safety feature of the present invention is illustrated in FIG. 3 in which a second control orifice 88 is formed in assembly 86 in the unitary valve body 12 in a fluid flow relationship between the second fluid passageway 68 and the atmosphere. A second control valve 89 with a shut-off pin 90 is sealably mounted with seal 84 in the unitary valve body 12 for movement between first and second positions to selectively open and close the second control orifice 88 thereby venting and closing the first chamber section 57 through vent 98 and chamber 96. A manual control knob such as handle 94 is coupled to the second shut-off pin 90 to manually move the shut-off pin 90 to selectively open and close the second control orifice 88 so as to provide a safety feature when in the open position and prevent the discharge of high pressure fluid with the use of the pivotal grip 26 shown in FIG. 2 until the manual control knob 94 moves the second shut-off pin 90 to the closed position.

It will be noted that the second orifice 66 in the piston 52 is smaller in diameter than either of the first and second control orifices 72 or 88. This simply means that when either of the shut-off pins 78 or 90 are in the open position thus venting the first chamber portion 57, the input fluid slowly passes through narrow orifice 66, passageway 68, control orifice 72 and passage 82 to the ambient pressure outside the system. This allows the input pressure to center the piston 52 against the spring 60 thus opening the dump channel 48. When, however, shut-off pin 90 is in the closed position and shut-off pin 78 is moved to the closed position, there is no longer a passageway to vent the first chamber section 57 and spring 60 begins to return the piston towards the channel 48 in the dump assembly 44. The fluid pressure quickly builds up on the backside of the piston 52 in the first chamber section 57 and with a snapping action forces the piston against the channel 48 thus closing it. Because of this snapping action and the high pressure sealing force of 10,000 to 20,000 lbs. on the back area of the piston 52 in first chamber section 57, 1100 to 2200 lbs. of closing force per square inch can be obtained. Thus, if there is even a slight imperfection in the seat area of channel 48, this pressure will deform it and make a good seal.

.It will be noted that should there be any wear on the shut-off pin 78 or control orifice 72, the control valve 28 can be quickly removed, a new control valve placed in contact with valve body 12 and handle 24 attached. Thus, the shut-off pin 78 can be made smaller than in the prior art and less expensive even if there is some erosion.

Figure 4:
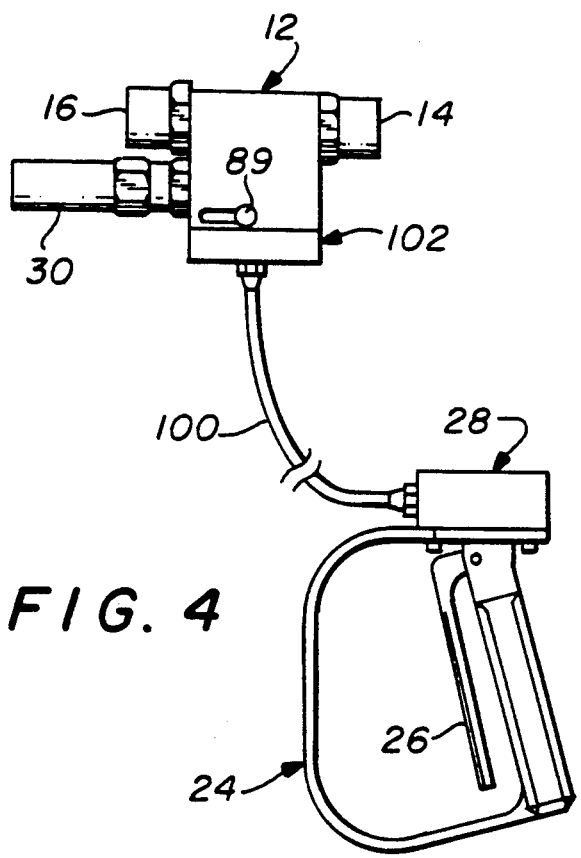
FIG. 4 is a side view of a remote trigger for operating the high pressure fluid gun at a remote distance.
Figure 5:
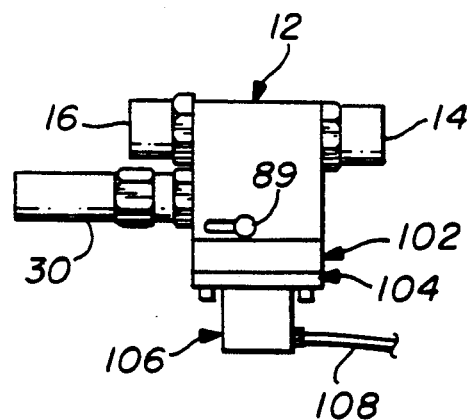
FIG. 5 is a side view of an air-operated remotely controlled trigger for operating the high pressure fluid gun at a distance.
Figure 6:
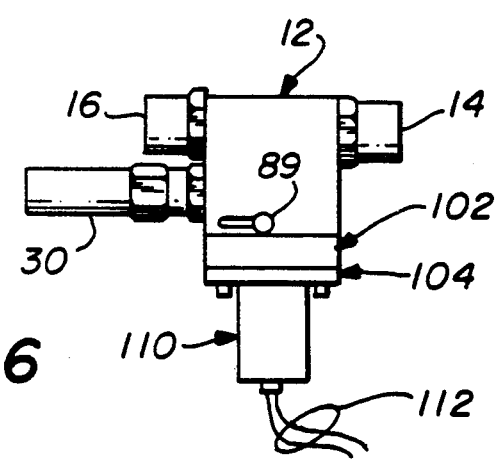
FIG. 6 is a side view of an electrically-operated solenoid as a remote trigger for operating the high pressure fluid gun at a remote distance.
Figure 7:
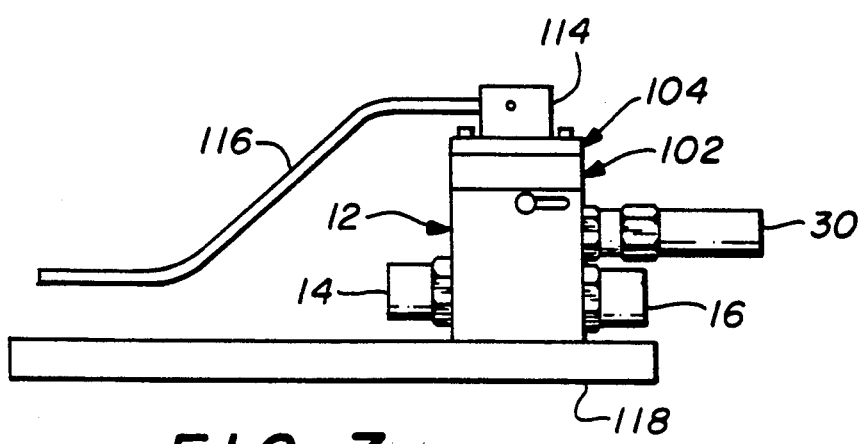
FIG. 7 is a side view of a foot-operated trigger for the high pressure fluid gun.

In addition, it is possible to use remote-controlled devices such as those illustrated in FIGS. 4, 5 and 6 and a foot operated device as illustrated in FIG. 7.

As can be seen FIG. 4, a hose 100 of any desired length connects the control valve 28 and handle 24 to the attachment plate 102 that is coupled to unitary valve body 12 in any well-known fashion. The plate 102 simply forms a seal and aligns an orifice coupling tube or hose 100 to the passageway 68 in the unitary valve body 12. The second control valve or safety valve 89 can be attached to the unitary valve body 12 as explained in relation to FIG. 3.

FIG. 5 is an air-operated device that simply has an air cylinder 106 coupled to a remotely controlled air source through hose 108 and attached by flange 104 to attachment plate 102. The air cylinder 106 can operate the shut-off pin 78 in FIG. 2 to close control orifice 72 whenever needed. Whenever the pressure is removed from the air cylinder 106, the spring 76 returns the shut-off pin 78 to its normal vent position.

In like manner, as shown in FIG. 6, an electrical solenoid 110 driven remotely by signals on wires or line 112 may also open or close the control orifice 72 in attachment plate 102 by causing the shut-off pin 78 to move inwardly to close the orifice 72 or allow spring 76 to retract the pin and open the orifice.

Again, in FIG. 7, a foot operated device is illustrated in which a lever 116, operated by the foot of the user, is pivotally attached to mounting 114 and connecting flange 104 to close the shut-off pin 78 against the spring 76 in control valve 102 in any well-known fashion.

Thus, there has been disclosed an improved high pressure dump valve assembly that has a unitary body having all of the components of the valve therein. The device is sturdy and yet economical to manufacture. It also has a control valve coupled to the unitary valve body in a fluid tight relationship and wherein the control valve has a shut-off pin to close or open a control orifice that is in contact with a chamber behind a slidable piston in the main valve body. An orifice in the piston couples the incoming fluid source to the rear of the piston and to the control orifice. When the control orifice is open, the incoming fluid can pass slowly through the orifice in the piston, which is smaller than the control orifice, to force the piston against a spring and open the dump valve channel. When the control orifice is closed, the fluid pressure behind the piston immediately builds up to a high pressure depending upon the size of the piston and, combined with the pressure of the spring, snaps the piston forward thus sealing the fluid dump channel and causing a high pressure to be output of the output nozzle assembly at the gun.

A novel safety feature is provided on the unitary valve in the form of a second control valve including a needle valve or shut-off pin and control orifice in parallel with the first control valve which, when open, prevents actuation of the handle grip controlling the shut-off pin in the first control orifice from having any effect on the high pressure outlet of the gun.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A valve for receiving a flow of fluid from a low pressure fluid source and selectively causing a high pressure output at the outlet of a nozzle assembly comprising:
   a unitary valve body;
   a first fluid passageway extending through the valve body and having the low pressure fluid source coupled to one end as an input and the high pressure fluid nozzle assembly coupled to the other end as an output;
   a valve chamber extending into the unitary valve body;
   a fluid pressure dump assembly sealably closing one end of the valve chamber, the assembly having a channel for dumping fluid in the chamber to the atmosphere;
   a piston slidably carried in the valve chamber, the piston having a first portion with a first diameter for sealably separating the chamber into first and second sections and a second portion with a second smaller diameter extending into the second chamber section for sealably mating with the channel in the dump assembly to prevent fluid flow to the atmosphere;

a resilient spring member interposed between the piston and the first chamber section to urge the piston in sealing relationship with the channel in the dump assembly;

a first orifice in the piston having a diameter sufficient to receive the resilient spring member and second orifice in the piston for enabling fluid communication between the first and second chamber sections;

a fluid conduit coupling the fluid passageway to the second chamber section such that fluid introduced at the low pressure inlet may be selectively used to either force the piston against and compress the resilient spring member in the first chamber section to open the channel in the dump assembly and dump the fluid in the second chamber section to atmosphere or to assist the spring member in snapping the piston against and sealing the dump assembly channel to create the high pressure output; and a manually operated control valve coupled to the first chamber section for selectively closing and venting the first chamber section such that, when the valve is in the closed position, the dump assembly channel is sealed with a snapping action of the piston and fluid is forced at high pressure out the high pressure nozzle and, when the valve is in the vent position, the dump assembly channel is open and the fluid is dumped to ambient pressure so as to remove the high pressure at the output of the high pressure nozzle.

2. A valve as in claim 1 wherein the control valve further comprises:

a second fluid passageway in the unitary valve body coupling the first chamber section to the outside of the unitary valve body;

a plate assembly rigidly connected to the unitary valve body;

a first control orifice in the plate assembly in sealed fluid flow alignment with the second fluid passageway in the unitary valve body, the first control orifice being larger in diameter than the second orifice in the piston;

a shut-off pin sealably mounted in the plate assembly for movement between the first and second positions to selectively open and close the first control orifice thereby venting and closing the first chamber section; and a third passageway in the plate assembly coupling the first control orifice to the atmosphere such that when the shut-off pin opens the first control orifice, the first chamber section in the unitary valve body is vented to atmosphere so as to enable the piston to open the channel in the fluid pressure dump assembly and remove the high pressure from the high pressure nozzle assembly and when the shut-off pin closes the control orifice, the first chamber section in the unitary valve body is pressurized through the piston second channel to cause the piston to close the dump assembly orifice with a snapping action.

3. A valve as in claim 2 further comprising:

a handle attached to the plate assembly; and a grip pivotally attached to the handle and in contact with the shut-off pin for manual movement between first and second positions such that when the grip is in the first position, the shut-off pin opens the first control orifice to dump the high pressure and when the grip is in the second position, the shut-off pin closes the first control orifice to create the high pressure at the high pressure outlet.

4. A valve as in claim 3 further including a resilient spring in contact with the shut-off pin to urge the pin into its first position to open the first control orifice, vent the first chamber section, open the channel in the fluid dump assembly and remove the high pressure from the high pressure nozzle assembly.

5. A valve as in claim 4 further including:

a second control orifice formed in the unitary valve body in a fluid flow relationship between the second fluid passageway and atmosphere, the second control orifice being larger in diameter than the second orifice in the piston; and a second shut-off pin sealably and slidably mounted to the unitary valve body for movement between first and second positions to selectively open and close the second control orifice thereby venting and closing the first chamber section.

6. A valve as in claim 5 further comprising a manual control device coupled to the second shut-off pin to manually move the second shut-off pin to selectively open and close the second control orifice so as to provide a safety device when in the open position and prevent the discharge of high pressure fluid with the use of the pivotal grip until the manual control device moves the second shut-off pin to the closed position.

7. A valve as in claim 6 wherein the second orifice in the piston is smaller in diameter than either of the first and second control orifices.

8. A valve as in claim further including a coupler for remotely connecting the control valve to the unitary valve body to control the high pressure output at a distance.

9. A valve as in claim 8 wherein the coupler is a fluid conduit coupled between the second fluid passageway in the unitary valve body and the control orifice in the control valve.

10. A valve as in claim 8 wherein the coupler comprises:

an air-operated device attached to the control valve for opening and closing the control valve; and an air source for selectively supplying control air to the air-operated device to open and close the control valve.

11. A valve as in claim 8 wherein the coupler comprises:

an electrical solenoid attached to the control valve for opening and closing the control valve; and electrical conductors coupled to the solenoid for receiving electrical signals to selectively open and close the control valve.

12. A valve as in claim 1 further comprising a foot-operated switch coupled to the first shut-off pin in the control valve such that the control valve can be controlled by an operator's foot.

* * * * *

UNITED STATES PATENT AND TRADEMARK OFFICE
CERTIFICATE OF CORRECTION

PATENT NO.  : 5,253,808
DATED       : Oct. 19, 1993
INVENTOR(S) : Amos Pacht

It is certified that error appears in the above-identified patent and that said Letters Patent is hereby corrected as shown below:

Column 4, line 56, after "FIG.", insert --1.--.

Column 10, line 38 (claim 8), after "claim", insert --1--.

Signed and Sealed this

Fourteenth Day of June, 1994

Attest:

BRUCE LEHMAN

*Attesting Officer*    *Commissioner of Patents and Trademarks*